United States Patent [19]

Kawakita et al.

[11] Patent Number: 4,694,793
[45] Date of Patent: Sep. 22, 1987

[54] ENGINE LUBRICANT TYPE AND CONDITION MONITORING SYSTEM

[75] Inventors: Tsunehiro Kawakita, Yokosuka; Minoru Imajo, Yokohama, both of Japan

[73] Assignee: Nissan Motor Co., Ltd., Yokohama, Japan

[21] Appl. No.: 929,373

[22] Filed: Nov. 12, 1986

[30] Foreign Application Priority Data

Nov. 15, 1985 [JP] Japan .................................. 60-255109

[51] Int. Cl.⁴ ............................................. F01M 1/00
[52] U.S. Cl. ............................. 123/196 S; 123/198 D; 184/108
[58] Field of Search ........... 123/196 S, 196 R, 198 D; 184/108; 310/317

[56] References Cited

U.S. PATENT DOCUMENTS 4,019,072 4/1977 Mifune et al. ........................ 310/317
4,306,525 12/1981 Faxvog .............................. 123/196 S

FOREIGN PATENT DOCUMENTS 59-43299 3/1984 Japan .

Primary Examiner—E. Rollins Cross
Attorney, Agent, or Firm—Schwartz, Jeffery, Schwaab, Mack, Blumenthal & Evans

[57] ABSTRACT

In order to obviate the need to manually input data relating to the grade of oil used to lubricate an engine, a monitoring system includes a sensor which senses the grade of oil along with sensors which enable the oil change procedure per se to be detected. After each oil change the output of the oil grade sensor is read and the appropriate values which determine the limits to which the oil may be permitted to degradate are automatically determined.

9 Claims, 3 Drawing Figures

ENGINE LUBRICANT TYPE AND CONDITION MONITORING SYSTEM

BACKGROUND OF THE INVENTION

1. Field of the Invention

The present invention relates generally to a system which is responsive to the age and condition of the oil utilized to lubricate an internal combustion engine or the like device and more specifically to a system which is capable of automatically determining both the need for oil change and the type of oil introduced into the system during the change.

2. Description of the Prior Art

In a prior proposed lubricant monitoring system disclosed in Japanese Patent Application First Provisional Publication No. 59-43299 published on Mar. 10, 1984 each time the oil is changed it is necessary to log the type (grade) and other pertinent data via a keyboard provided onboard the vehicle. However, this system has suffered from the drawback that most vehicle users are not at all familiar with physical and chemical composition of the oil which is filled into the sump of the vehicle and thus often to input erroneous data into the system. Even those who are technically familiar with lubricants sometimes inadvertently input incorrect data. This of course reduces the reliablity and utility of the system.

SUMMARY OF THE INVENTION

It is an object of the present invention to provide a lubricant monitoring system which senses the type of oil introduced during an oil change and which automatically sets the various parameters relating to the same thus obivating the risk of erroneous data being manually inputted.

In brief, the above object is achieved by a monitoring system which includes a sensor which senses the grade of oil along with engine/vehicle operation sensors which enable the oil change procedure per se to be detected. Immediately after each oil change the output of the oil grade sensor is read, the type of oil introduced determined and the appropriate values which determine the limits to which the particular oil may be permitted to degrade automatically determined.

More specifically, a first aspect of the present invention comes in the form of a lubricant monitoring system for an internal combustion engine or the like device which comprises: a first sensor for sensing the type of oil contained in the lubricating system; a second sensor for sensing the level of oil in the lubricating system; a third sensor for sensing a parameter which varies with the rate of degradation of the oil in the lubricating system; control means responsive to the first, second and third sensors for: (a) determining when an oil change is required; (b) determining when the oil is drained from the system; (c) determining the type of oil which is introduced following the draining; and (d) setting values which are used to determine when an oil change is required.

A further aspect of the invention comes in a method of operating an engine having a lubricating system, the method being characterized by the steps of: (a) sensing the type of oil contained in the lubricating system; (b) sensing the level of oil in the lubricating system; (c) sensing a parameter which varies with the rate of degradation of the oil in the lubricating system; (d) utilizing the data derived in step (c) to determine when an oil change is required; (e) utilizing the data derived in step (b) to determine when the oil is drained from the system; (f) utilizing the data derived in step (a) to determine the type of oil which is introduced following the draining; and (g) utilizing the data derived in step (f) to set values which are used to determine when an oil change is required.

DETAILED DESCRIPTION OF THE PREFERRED EMBODIMENTS

Figure 1:
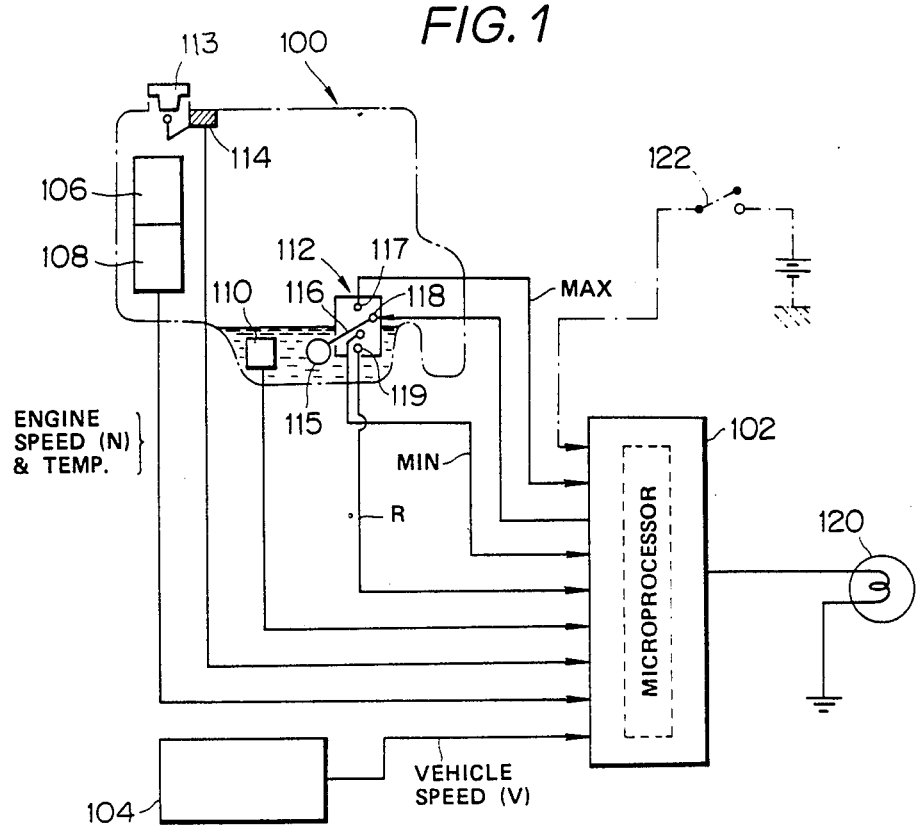
FIG. 1 is a schemmatic elevational view of an internal combustion engine equipped with a lubricant monitoring system according to the present invention.

FIG. 1 of the drawings shows an engine 10 equipped with a lubricant monitoring system according to the present invention. This system includes a control unit 102 which in this instance includes a microprocessor and which is supplied data from a plurality of sensors including: a vehicle speed sensor 104; a engine rotational speed sensor 106; a temperature sensor 108; an oil grade sensor 110; a lubricant level sensor 112 and a sensor 114 which is responsive to the filler cap 113 being removed and the filler port being open in a manner which permits oil to be charged into the system. Although not specifically illustrated in FIG. 1 it will be understood that the microprocessor mentioned above includes at least one CPU, RAM, ROM and I/O interface.

In this embodiment the filler cap sensor 114 is arranged to output a signal indicative of the cap being removed and the filler port being open and capable of receiving fresh lubricant. The level sensor 112 is arranged to include a float 115, an arm 116 which supports the float 115 and which functions as a movable contact, and three stationary contacts 117, 118 and 119. These contacts are arranged so that the uppermost one 117 is contacted by the movable contact (arm 116) when the level of oil is at its maximum level and issues a signal MAX to the I/O interface of the microprocessor included in the control unit 102; the intermediate one 118 is contacted when the level of oil has lowered to its minimum permissible level and issues a signal MIN; and the lowermost one 119 contacted when the sump of the engine is essentially drained and ready to receive a fresh charge of oil. Upon contact 119 being contacted by the arm 116 a signal R is fed to the control unit 102.

The so called "oil grade sensor" 110 can be arranged to sense parameters such as the alkalinity, acidity, viscousity etc., of the oil contained in the engine lubricating system.

Figure 2:
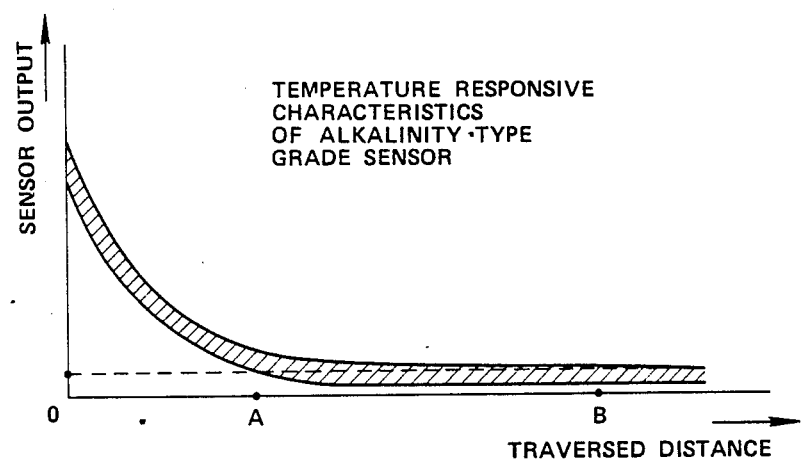
FIG. 2 is a graph showing in terms of lubricant alkalinity and traversed distance the effect of temperature on an alkalinity type oil grade sensor.

In the instant embodiment the sensor is arranged to sense alkalinity. However, it is to be noted that temperature has a large influence on both the output of this type of sensor in addition to the rate at which the oil degrades. For example, while alkalinity can be possibly considered the best parameter to measure in order to determine the type or grade of oil being used, it will be noted from FIG. 2 that output level of the sensor tends to vary over a wide range (shown in hatching) in response to the temperature of the oil. Hence, depending on the temperature of the oil it is possible for the sensor to indicate that the alkalinity level has dropped to its minimum acceptable level at point "A" at one temperature and at point "B" at another.

Accordingly, the present invention contemplates reading the output of the grade sensor 110 only after an oil change and at which time it is exposed to the cool and as yet undegraded new oil. In order to further ensure an accurate determination of the grade of the new oil it is of course within the scope of the invention to measure the temperature of the oil at this time and correct the reading accordingly. This allows for the minor temperature variations which tend to occur when the oil is changed while the engine is still warm or, on the other hand, is very cold due to non-use in a cold environment, by way of example.

Figure 3:
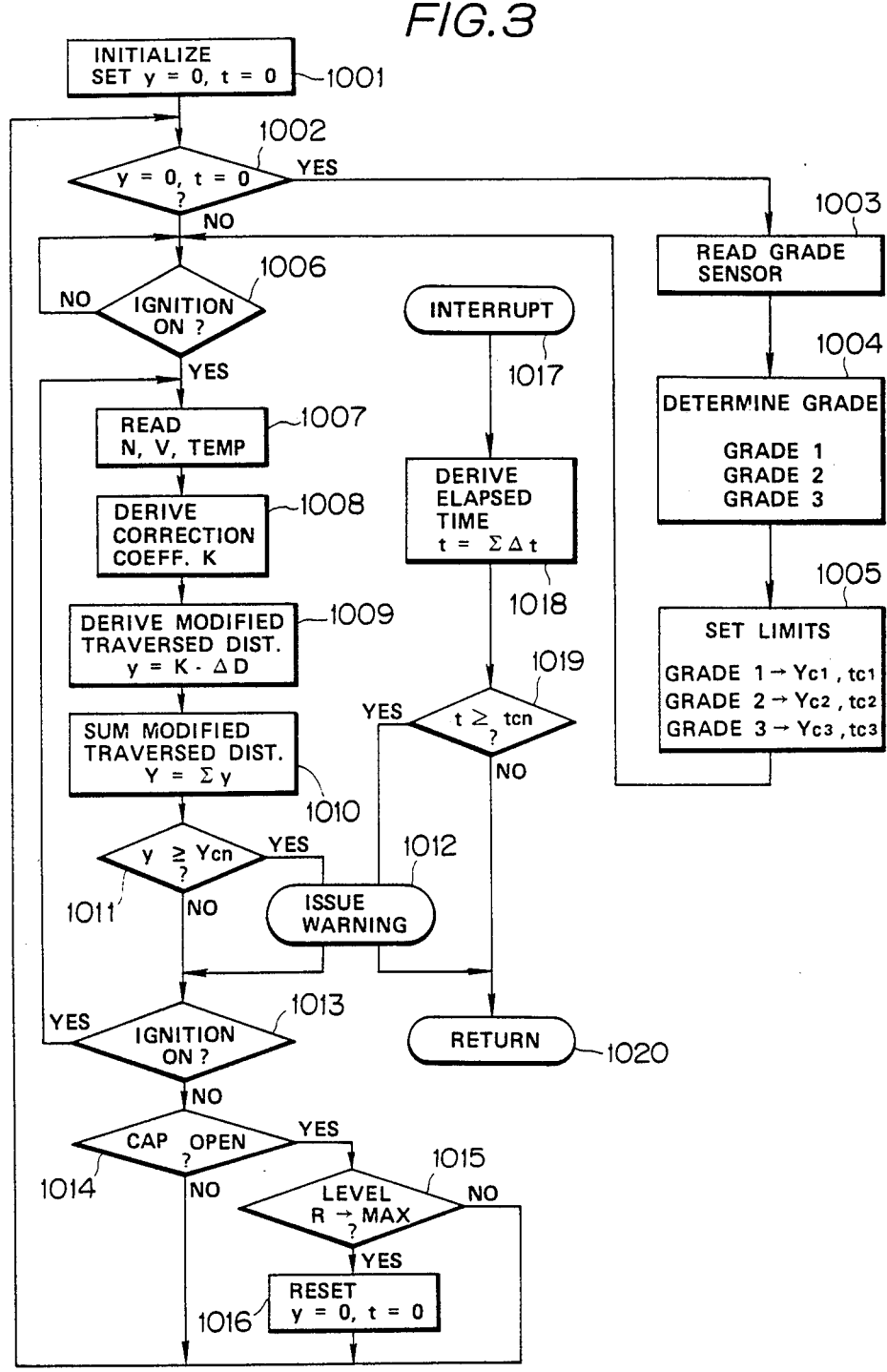
FIG. 3 is a flow chart showing the steps which characterize the operation of the embodiment of the present invention.

FIG. 3 is a flow chart showing the characterizing steps which are executed during operation of the embodiment of the invention. Step 1001 of this program will normally be executed very infrequently such as after initial installation of the system. Other than this it is contemplated to continuously cycle through the program whenever the vehicle ignition key is rotated to the ACC position wherein electrical power is supplied to the various accessory systems of the vehicle. During periods when the engine is not in use or the ignition key is not appropriately set, current data is stored in a non-volatile memory such as CMOS RAM having its own back-up battery.

At step 1002 the instant status of two parameter values Y and T are determined. In this instance Y denotes a distance related degradation variable while T denotes a time related one. If these values are both zero then it is assumed that the vehicle oil has just been changed and is completely new and as yet unused, and the program flows across to step 1003 wherein the output of grade sensor 110 is read. As mentioned above it is possible at this time to also read the output of the temperature sensor 108 and set step 1003 is used to determine the grade of oil which is in the system. This may be performed by use of a suitable algorithm or table look-up for example. Subsequently, at step 1005 the appropriate minimum acceptable values of Y and T (Ycn and Tcn) for the given oil are detained and set into RAM.

At step 1006 the output of a device such as the engine ignition switch or the like is sampled in order to determined whether the engine is currently in use. Until this step indicates that the engine is being operated the program recycles. At step 1007 data pertinent to the rate at which the lubricant oil degrades are read. In this instance the data takes the form of the instant engine speed, vehicle speed and oil temperature (or a temperature which varies therewith). In view of the values derived in this step the instant correction or weight coefficient K is derived. This coefficient is derived in a manner to permit the instant oil degradation increment to be by adjusted in accordance with the effect of the instant engine speed, vehicle speed and temperature on the oil. For further disclosure relating to this aspect reference may be had to copending U.S. patent application Ser. No. 772,928 filed on Sept. 5, 1985 in the name of Ryuzaburo Inoue. The content of this application is hereby incorporated by reference thereto.

The above mentioned application describes the effect of engine speed load and temperature on the rate of oil degradation in terms of viscousity, alkalinity and infusible matter content and how the amount of degradation which occurs in each category can be anticipated and combined in a manner which enables the derivation of a correction coefficient using a suitable computer program and/or table look-up. A brief explanation relating to each category each is set forth hereinunder. (Viscousity)

If the viscousity of the oil is either above or below a preferred range the lubricating efficiency of the same falls off markedly increasing the rate of abrasion of the moving parts of the engine. Oil viscousity is increased by oxidation which is promoted by high temperatures and also by contamination by combustion products such as blowby gas (the volume of blowby gas tends to be high at high load/temperature engine operation). On the other hand, dilution with gasoline such as occurs when the engine is operated on very rich mixtures as is apt to occur during cold engine starts, reduces the oil viscousity. Moreover, when subject to powerful shearing forces the agents added to the oil to control its viscousity tend to be physically degraded. Hence, the effect of temperature and engine speed on the viscousity of the oil can be predicted on the basis of experimental data and emprical results and the effect suitably anticipated via computer program. (Alkalinity)

The alkalinity or basicity of the oil is dependent on the amount of acidic matter such as sulfur and the like contained in the engine fuel which is permitted to contaminate the same. Reduced alkalinity invites corrosion of the engine components. Elevated temperatures tend to speed the rate at which the alkalinity level of the oil decreases. Viz., at low temperatures metal particles and metal oxides tend to form a sludge. However, as the temperature of the oil rises the reaction between the alkaline content of the oil and the metal contaminant increases and the basicity rapidly decreases. Hence, by monitoring the engine temperature the detremental effect of high engine load operation and corresponding high temperature conditions on the oil alkalinity can be predicted. (Infusible matter)

At low temperatures the amount of metal abrasion between the moving parts of the engine is relatively high while at elevated temperatures the oxidation of the oil which produces smoke and similar carbonization. Monitoring engine speed and temperature enables the prediction of the effect on the longevity of the oil from the view point of infusible matter contamination.

In step 1009 the instant vehicle speed is multiplied by a given unit of time and value indicative of the instant increment of distance being traversed by the vehicle is determined. This value is then modified using the correction coefficient K in a manner to reflect the overall amount of degradation (in terms of distance) of the oil as predicted in view of the instant set of operational conditions.

In step 1010 the total amount of "effective" distance over which the oil has been used is summed and the distance related degradation variable Y derived.

In step 1011 the instant value of Y is compared with the value of Ycn set into RAM in step 1005. In the event that the instant value of Y is below Ycn then at step 1013 the operational status of the engine is determined. If the engine is being operated (e.g. the engine ignition switch is found to be ON) then the program recycles to step 1007. However, in the event that value of Y exceeds that of Ycn then at step 1012 a command to issue a warning that the oil is in need of being changed is generated. This step may take the form of inducing a bulb 120 or buzzer to be energized briefly. Viz., produced a beeping or flashing light signal which will call attention to the condition of the lubricant oil.

However, if at step 1013 the engine is found to be in a non-operative state then at step 1014 the status of the oil filler cap 113 is determined. If the cap is found to be closed then the routine recycles to step 1002. On the other hand, if the cap 113 is open the output of the oil level sensor 112 is read and a determination made as to whether the level of oil has risen from level R (empty) to a MAX level (full). If the level has not changed as required the program recycles to step 1002. However, in the event that the oil is changed in a manner which induces the R—MAX level change a command to reset the values of Y and T to zero is issued at step 1016. Alternatively, it is possible equip the system with a manually operable reset button 122 (shown in phantom in FIG. 1) and arrange for step 1016 to permit a reset via depression of said button.

It is also possible to arrange for step 1014 to include a soft clock which requires the cap to have been open for more than a predetermined period of time before the program is permitted to go to step 1015 and thus ensure that vibration or the like has not induced an erroneous cap "open" signal.

As the condition of the lubricating oil degrades with the passing of time once filled into the lubricating system, a timer (steps 1017 to 1020) is arranged to monitor the period which has elapsed since its introduction into the system and to induce the generation of the warning signal (step 1012) upon the count reaching a predetermined level. This level Tcn is variable with the grade of oil and is determined in step 1005. The timer may take the form of a soft clock which counts up by one each time an interrupt (step 1017) is performed or alternatively sample the count of a hard clock included in the microprocessor arrangement per each interrupt routine run.

For further disclosure relating to the above type of monitoring systems, reference may be had to copending U.S. patent application Ser. No. 828,358 filed on Feb. 11, 1986 in the name of Imajo and Kawakita which deals with a system arranged to allow for the occasional topping-up of the oil in the system which tend occur between oil changes; and to copending U.S. Appln. Ser. No. 838,619 filed on Mar. 11, 1986 in the names of Imajo and Kawakita which discloses a technique wherein both the time and distance degradation variables used to predict the degradation status of the lubricant oil are modified using correction coefficients.

What is claimed is:

1. In an engine having a lubricating system, a lubricant monitoring system comprising:
    a first sensor for sensing the type of oil contained in the lubricating system;
    a second sensor for sensing the level of oil in the lubricating system;
    a third sensor for sensing a first system operation parameter which varies with the rate of degradation of the oil in the lubricating system;
    control means responsive to said first, second and third sensors for:
    (a) determining when an oil change is required;
    (b) determining when the oil is drained from the system;
    (c) determining the type of oil which is introduced following the draining; and
    (d) setting values which are used to determine when an oil change is required.

2. A lubricant monitoring system as claimed in claim 1, wherein said first sensor is arranged to sense one of the alkalinity and viscousity of the oil.

3. A lubricant monitoring system as claimed in claim 1, further comprising a fourth sensor for sensing a second system operation parameter which varies with the rate of degradation of the oil in the lubricating system, said control means being responsive to the fourth sensor for determining when an oil change is required.

4. A lubricant monitoring system as claimed in claim 3, further comprising a fifth sensor for sensing a third system operation parameter which varies with the rate of degradation of the oil in the lubricating system, said control means being responsive to the fifth sensor for determining when an oil change is required.

5. A lubricant monitoring system as claimed in claim 1, wherein said second sensor is constructed and arranged to output a first signal when the lubricating system is filled with oil, a second signal when the level of oil is at the minimum permissible level and a third signal when the system is essentially empty of oil.

6. A lubricant monitoring system as claimed in claim 4, wherein said first second and third system operational parameters take the form of the oil temperature, engine speed and vehicle speed.

7. In a method of operating an engine having a lubricating system, the steps comprising:
    (a) sensing the type of oil contained in the lubricating system;
    (b) sensing the level of oil in the lubricating system;
    (c) sensing a parameter which varies with the rate of degradation of the oil in the lubricating system;
    (d) utilizing the data derived in step (c) to determine when an oil change is required;
    (e) utilizing the data derived in step (b) to determine when the oil is drained from the system;
    (f) utilizing the data derived in step (a) to determine the type of oil which is introduced following the draining; and
    (g) utilizing the data derived in step (f) to set values which are used to determine when an oil change is required.

8. A method as claimed in claim 7, wherein step (a) includes sensing one of the oil viscousity and alkalinity.

9. A method as claimed in claim 7, wherein step (d) includes predicting on the basis of the data derived in step (c) and predetermined data the current degradation status of the oil.

* * * * *